United States Patent
Nakazawa et al.

(10) Patent No.: US 10,207,691 B2
(45) Date of Patent: Feb. 19, 2019

(54) BRAKE APPARATUS

(71) Applicant: Hitachi Automotive Systems, Ltd., Hitachinaka-shi, Ibaraki (JP)

(72) Inventors: Chiharu Nakazawa, Kawasaki (JP); Ryohei Maruo, Kawasaki (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 88 days.

(21) Appl. No.: 15/317,278

(22) PCT Filed: Jun. 12, 2015

(86) PCT No.: PCT/JP2015/067003
§ 371 (c)(1),
(2) Date: Dec. 8, 2016

(87) PCT Pub. No.: WO2015/198889
PCT Pub. Date: Dec. 30, 2015

(65) Prior Publication Data
US 2017/0113669 A1 Apr. 27, 2017

(30) Foreign Application Priority Data
Jun. 25, 2014 (JP) .................................. 2014-129866

(51) Int. Cl.
*B60T 13/14* (2006.01)
*B60T 11/224* (2006.01)
(Continued)

(52) U.S. Cl.
CPC ............. *B60T 11/224* (2013.01); *B60T 7/042* (2013.01); *B60T 8/3275* (2013.01);
(Continued)

(58) Field of Classification Search
CPC .... B60T 13/145; B60T 13/146; B60T 13/161; B60T 13/165; B60T 13/166; B60T 8/4013; B60T 8/441
See application file for complete search history.

(56) References Cited

U.S. PATENT DOCUMENTS

| | | | | |
|---|---|---|---|---|
| 4,678,243 | A | * | 7/1987 | Leiber ................... B60T 8/3275 303/113.4 |
| 4,693,521 | A | * | 9/1987 | Takata ................... B60T 8/3265 303/115.4 |

(Continued)

FOREIGN PATENT DOCUMENTS

| | | |
|---|---|---|
| JP | 2002-264797 A | 9/2002 |
| JP | 2012-224323 A | 11/2012 |
| JP | 5317069 B2 | 7/2013 |

OTHER PUBLICATIONS

International Search Report (PCT/ISA/210) issued in PCT Application No. PCT/JP2015/067003 dated Sep. 1, 2015 with English translation (Two (2) pages).

(Continued)

*Primary Examiner* — Bradley T King
*Assistant Examiner* — Stephen M Bowes
(74) *Attorney, Agent, or Firm* — Crowell & Moring LLP (57) ABSTRACT

A brake apparatus includes a brake operation member, a state detection unit, a cylinder, a first portion, an operation rod, a stepped piston, first, second, and third seal members, first and second pressure chambers, a hydraulic source, and first and second oil passages. The brake apparatus also includes a fluid amount control unit. The fluid amount control unit is configured to control an amount of the brake fluid to be supplied to the first pressure chamber and the second pressure chamber. The fluid amount control unit is also configured to increase the amount of the brake fluid to (Continued)

be supplied to the second pressure chamber when the detected state is equal to a preset pressure increase request.

17 Claims, 6 Drawing Sheets

(51) Int. Cl.
*B60T 7/04* (2006.01)
*B60T 13/16* (2006.01)
*B60T 13/66* (2006.01)
*B60T 13/68* (2006.01)
*B60T 8/32* (2006.01)
*B60T 11/236* (2006.01)

(52) U.S. Cl.
CPC ........... *B60T 11/236* (2013.01); *B60T 13/162* (2013.01); *B60T 13/166* (2013.01); *B60T 13/662* (2013.01); *B60T 13/686* (2013.01)

(56) References Cited

U.S. PATENT DOCUMENTS

| | | | | |
|---|---|---|---|---|
| 4,914,917 | A * | 4/1990 | Schonlau | B60T 13/145 303/113.4 |
| 5,934,432 | A * | 8/1999 | Bates | F16D 25/088 192/85.56 |
| 2002/0000751 | A1* | 1/2002 | Nishii | B60T 8/3275 303/113.1 |
| 2013/0167716 | A1 | 7/2013 | Uechi et al. | |
| 2013/0175851 | A1 | 7/2013 | Honda et al. | |
| 2015/0197228 | A1* | 7/2015 | Isono | B60T 11/224 92/61 |
| 2015/0210256 | A1* | 7/2015 | Yamashita | B60T 7/22 303/14 |

OTHER PUBLICATIONS

Japanese-language Written Opinion (PCT/ISA/237) issued in PCT Application No. PCT/JP2015/067003 dated Sep. 1, 2015 (Three (3) pages).

* cited by examiner

BRAKE APPARATUS

TECHNICAL FIELD

The present invention relates to a brake control apparatus that applies a braking force to a vehicle.

BACKGROUND ART

Conventionally, there is known a technique discussed in PTL 1 as a brake apparatus. In this patent literature, a brake pedal to be operated by a driver and a piston for generating a master cylinder pressure are separated from each other, and a hydraulic source capable of pressing the piston is provided.

CITATION LIST

Patent Literature

PTL 1: Japanese Patent No. 5317069

SUMMARY OF INVENTION

Technical Problem

However, the brake apparatus discussed in PTL 1 relies on a discharge capability of a pump serving as the hydraulic source for pressing the piston, which may lead to necessity of a high-pressure hydraulic source to satisfy a characteristic capable of increasing the pressure with high responsiveness. An object of the present invention is to provide a brake apparatus that can achieve the characteristic capable of increasing the pressure with high responsiveness without relying on the discharge capability of the pump.

Solution to Problem

To achieve the above-described object, according to one embodiment of the present invention, a brake apparatus includes an operation rod configured to be activated according to an operation of a brake operation member and having a first diameter, a stepped piston including an intermediate-diameter portion having a larger diameter than the first diameter on one side, a large-diameter portion having a larger diameter than the diameter of the intermediate-diameter portion, and an insertion hole in which the operation rod is relatively displaceably inserted from an axial direction, a first pressure chamber configured to act on between the first diameter and the intermediate-diameter portion, and a second pressure chamber configured to act on between the intermediate-diameter portion and the large-diameter portion. The brake apparatus controls an amount of brake fluid to be supplied to the first pressure chamber and the second pressure chamber, and increases the amount of the brake fluid to be supplied to the second pressure chamber when a detected state is a pressure increase request requiring high responsiveness.

Advantageous Effects of Invention

Therefore, the brake apparatus can secure a sufficient brake fluid amount when the detected state is the pressure increase request requiring the high responsiveness, and therefore can improve the responsiveness for increasing the pressure.

DESCRIPTION OF EMBODIMENTS

[First Embodiment]

Figure 1:
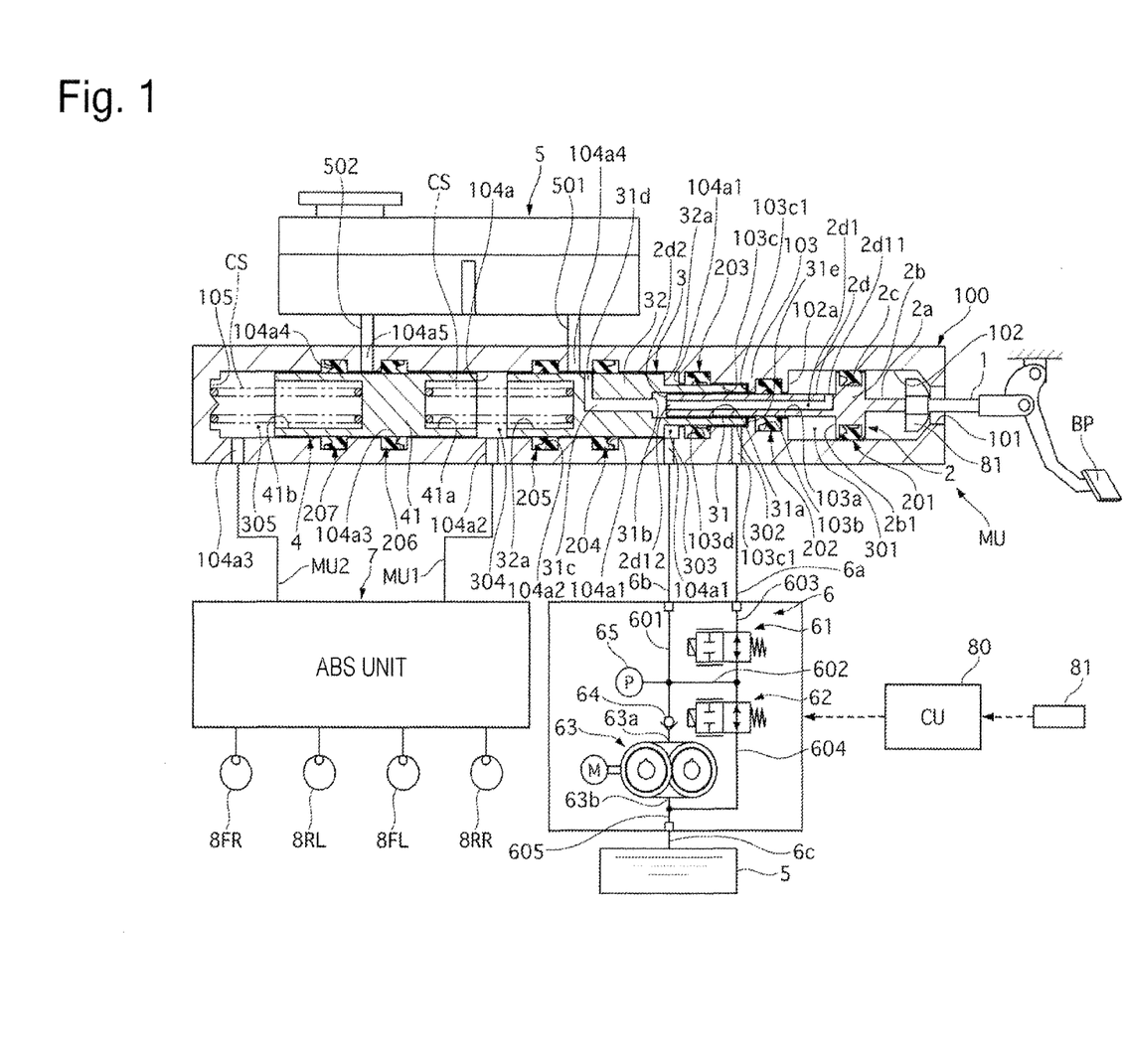
FIG. 1 is a system diagram schematically illustrating a configuration of a brake apparatus according to a first embodiment.

FIG. 1 is a system diagram schematically illustrating a configuration of a brake apparatus according to a first embodiment. The brake apparatus is a hydraulic brake apparatus applied to a brake system of an electric vehicle, such as a hybrid vehicle including an electric motor (a generator) besides an engine and an electric vehicle including only the electric motor (the generator) as a prime mover that drives wheels. Such an electric vehicle can carry out regenerative braking, which brakes the vehicle by converting a kinetic energy of the vehicle into electric energy with use of a regenerative braking apparatus including the motor (the generator). The brake apparatus supplies brake fluid as working fluid to a brake activation unit mounted on each of wheels FL to RR of the vehicle to generate a brake hydraulic pressure (a wheel cylinder hydraulic pressure), thereby applying a hydraulic braking force to each of the wheels FL to RR. The brake apparatus does not include an engine negative-pressure booster, which boosts a brake operation force by utilizing an intake negative pressure generated by the engine of the vehicle.

The brake activation unit including wheel cylinders 8FR, 8FL, 8RL, and 8RR (hereinafter collectively referred to as the wheel cylinders 8) is a so-called disk type brake device, and includes a brake disk and a caliper (a hydraulic brake caliper). The brake disk is a brake rotor that rotates integrally with a tire. The caliper includes a brake pad that is disposed with a predetermined clearance (a space, or a gap due to loose mounting) with respect to the brake disk, and generates the braking force by being displaced by the wheel cylinder hydraulic pressure into contact with the brake disk. The brake apparatus includes two brake pipe systems (a primary system and a secondary system), and employs, for example, a so-called X-split pipe configuration. The brake apparatus may employ another piping method, such as a front/rear split pipe configuration.

The brake apparatus includes a brake pedal BP, a reservoir tank (hereinafter referred to as a reservoir) 5, a pump unit 6, a master cylinder unit MU, and an ABS unit 7. The brake pedal BP serves as a brake operation member that receives an input of a brake operation performed by an operator (a driver). The reservoir 5 is a brake fluid source that stores the brake fluid therein, and is a low-pressure portion opened to an atmospheric pressure. The pump unit 6 generates a hydraulic pressure by introducing the brake fluid from the reservoir 5 with the aid of a gear pump 63 driven by a motor M. The master cylinder unit MU is connected to the brake pedal BP and is also replenished with the brake fluid from the reservoir 5, and generates a brake hydraulic pressure (a master cylinder hydraulic pressure) by being activated by the operation performed by the driver on the brake pedal BP and/or supply of the brake fluid from the pump unit 6. The ABS unit 7 controls the wheel cylinder hydraulic pressure based on the master cylinder hydraulic pressure supplied from the master cylinder unit MU. The ABS unit 7 is a hydraulic controller capable of performing so-called antilock brake control, and is configured to be able to appropriately control the wheel cylinder pressure of a wheel that is getting locked according to a state of a wheel speed. The ABS unit 7 according to the first embodiment is configured to be also able to perform vehicle dynamics control, which controls a behavior of the vehicle with use of the master cylinder unit MU as a hydraulic source, as will be described below.

The master cylinder unit MU includes a generally cylindrical master cylinder housing 100. The master cylinder housing 100 forms a cylinder having an opening 101 opened for insertion of a push rod 1 on one end side, and a closed portion 105 where the master cylinder housing 100 is closed on an opposite end side. A cylindrical operation rod containing portion 102, in which an operation rod 2 is slidable, is provided adjacent to the opening 101. In the operation rod containing portion 102, a pressing force sensor 81, which detects a brake pedal pressing force of a driver, is provided at a portion where the push rod 1 and the operation rod 2 are connected to each other. The operation rod 2 includes a first piston 2*b*, a pedal-side rod 2*a*, and a small-diameter piston 2*d*. The first piston 2*b* divides the operation rod containing portion 102 into two chambers. The pedal-side rod 2*a* is smaller in diameter than the first piston 2*b*, and extends from a side wall of the first piston 2*b* on the opening 101-side toward the push rod 1. The small-diameter piston 2*d* is smaller in diameter than the first piston 2*b*, and extends from a side wall 2*b*1 of the first piston 2*b* on the closed portion 105-side toward the closed portion 105-side. The small-diameter piston 2*d* is inserted in a small-diameter piston through-hole 103*a* formed through a first partition wall 103 of the operation rod containing portion 102 on the closed portion 105-side. Further, a side wall 102*a*, an inner wall of the operation rod containing portion 102, and the first piston 2*b* form a reservoir chamber 301. A seal groove 2*c* is formed on an outer periphery of the first piston 2*b*, and a first cup seal 201 is provided in this seal groove 2*c*. The first cup seal 201 prohibits the brake fluid from leaking from the reservoir chamber 301. A small-diameter piston inner shaft center flow passage 2*d*1, through which the brake fluid flows, is formed along a shaft center of the small-diameter piston 2*d*. The small-diameter piston inner shaft center flow passage 2*d*1 is in communication with an opening 2*d*12 of an end 2*d*2 formed at the small-diameter piston 2*d* on the closed portion 105-side. Further, the small-diameter piston inner shaft center flow passage 2*d*1 is in communication with a radial flow passage 2*d*11. The radial flow passage 2*d*11 is formed at the small-diameter piston 2*d* on the opening 101-side and on the closed portion 105-side with respect to the side wall 2*b*1 of the first piston 2*b*. The radial flow passage 2*d*11 is opened to the reservoir chamber 301.

The first partition wall 103 includes an intermediate-diameter piston insertion hole 103*c* formed adjacent to the small-diameter piston through-hole 103*a* and having a larger inner diameter than an inner diameter of the small-diameter piston through-hole 103*a*. Further, a large-diameter piston insertion hole 104*a* is provided in the master cylinder housing 100. The large-diameter piston insertion hole 104*a* is formed adjacent to the intermediate-diameter piston insertion hole 103*c*, and has a larger inner diameter than the inner diameter of the intermediate-diameter piston insertion hole 103*c*. A stepped primary piston 3 and a secondary piston 4 are provided in the large-diameter piston insertion hole 104*a*. The stepped primary piston 31 includes an intermediate-diameter piston 31 formed on one end side thereof, which is the brake pedal BP-side, and a large-diameter piston 32 formed on an opposite end side. The secondary piston 4 is the same in diameter as the large-diameter piston 32. The stepped primary piston 3 includes an insertion hole 31*a* formed by piercing the stepped primary piston 3 from an intermediate-diameter doughnut-shaped end surface 31*e* of the intermediate-diameter piston 31, which is the brake pedal BP-side, in a stroke direction. The insertion hole 31*a* is formed so as to have a generally same inner diameter as the inner diameter of the small-diameter piston 2*d*. The small-diameter piston 2*d* is inserted in the insertion hole 31*a* displaceably relative to the stepped primary piston 3. A large-diameter piston inner shaft center flow passage 31*c* is formed in the stepped primary piston 3. The large-diameter piston inner shaft center flow passage 31*c* is opened to a bottom 31*b* of the insertion hole 31*a*. Further, the large-diameter piston inner shaft center flow passage 31*c* is in communication with a radial flow passage 31*d* formed in the large-diameter piston 32 at a position that is in communication with the reservoir 5. A spring containing portion 32*ab*, in which a coil spring CS is contained, is formed in the stepped primary piston 3 on the closed portion 105-side. Similarly, a spring containing portion 41*a* is formed in the secondary piston 4 on the stepped primary piston 3-side, and a spring containing portion 41*b* is formed in the secondary piston 4 on the closed portion 105-side.

A seal groove 103*b* is formed on an inner periphery of the small-diameter piston through-hole 103*a*, and a second cup seal 202 is provided in this seal groove 103*b*. The second cup seal 202 prohibits the brake fluid from leaking from the intermediate-diameter piston insertion hole 103*c* to the reservoir chamber 301. A seal groove 103*d* is formed on an inner periphery of the intermediate-diameter piston insertion hole 103*c*, and a third cup seal 203 is provided in this seal groove 103*d*. The third cup seal 203 prohibits the brake fluid from leaking from the large-diameter piston insertion hole 104*a* to the intermediate-diameter piston insertion hole 103*c*. Seal grooves 104*a*1, 104*a*2, 104*a*3, and 104*a*4 are formed on an inner periphery of the large-diameter piston insertion hole 104*a* in this order from the brake pedal BP-side. A fourth cup seal 204, a fifth cup seal 205, a sixth cup seal 206, and a seventh cup seal 207 are provided in the seal groove 104*a*1, 104*a*2, 104*a*3, and 104*a*4, respectively.

A first pressure chamber 302 is formed between the intermediate-diameter doughnut-shaped end surface 31*e*, which is sandwiched between an outer periphery of the small-diameter piston 2*d* and an outer periphery of the intermediate-diameter piston 31, and the intermediate-diameter piston insertion hole 103*c*, between the second cup seal 202 and the third cup seal 203. A first pressure chamber radial flow passage 103*c*1 is in communication with the first pressure chamber 302. A second pressure chamber 303 is formed between a large-diameter doughnut-shaped end surface 32*a*, which is sandwiched between an outer periphery of the large-diameter piston 32 and the outer periphery of the intermediate-diameter piston 31, and the large-diameter piston insertion hole 104a, between the third cup seal 203 and the fourth cup seal 204. A second pressure chamber radial flow passage 104a1 is in communication with the second pressure chamber 303. A primary hydraulic chamber 304 is formed between the stepped primary piston 3 and the secondary piston 4, between the fifth cup seal 204 and the sixth cup seal 205. A primary radial flow passage 104a2, which is in communication with the primary hydraulic chamber 304, is provided in the master cylinder housing 100. A secondary hydraulic chamber 305 is formed between the secondary piston 4 and the large-diameter piston insertion hole 104a, between the seventh cup seal 207 and the closed portion 105. A secondary radial flow passage 104a3, which is in communication with the secondary hydraulic chamber 305, is provided in the master cylinder 100. The primary hydraulic chamber 304 and the secondary hydraulic chamber 305, which are provided in this large-diameter piston insertion hole 104a, form a tandem-type master cylinder.

A portion between the fourth cup seal 204 and the fifth cup seal 205 is connected to the reservoir 5 via a flow passage 501, thereby forming a low-pressure chamber. Similarly, a portion between the sixth cup seal 206 and the seventh cup seal 207 is connected to the reservoir 5 via a flow passage 502, thereby forming a low-pressure chamber. As described above, the radial flow passage 31d formed through the large-diameter piston 32 is in communication with the portion between the fourth cup seal 204 and the fifth cup seal 205. Then, the reservoir 5 is in constant communication with the reservoir chamber 301 via the radial flow passage 31d, the large-diameter piston inner shaft center flow passage 31c, the small-diameter piston inner shaft center flow passage 2d1, and the radial flow passage 2d11.

The pump unit 6 includes the gear pump 63 driven by the motor M, a normally-opened switching valve 61, and a normally-opened pressure reduction control valve 62. A second flow passage 601, which is connected to a discharge port 63a of the gear pump 63, includes a check valve 64, which prevents a reverse flow toward the discharge port 63a of the gear pump 63. The second flow passage 601 is connected to the second pressure chamber 303 via a pipe 6b. A branch oil passage 602, which branches off from the second flow passage 601, is divided into a first flow passage 603 connected to the first pressure chamber 302 via a pipe 6a, and a pressure adjustment oil passage 604 connected to an intake flow passage 605 connecting an intake port 63b of the gear pump 63 and the reservoir 5 to each other. The switching valve 61 is provided in the first flow passage 603. The pressure reduction control valve 62 is provided in the pressure adjustment oil passage 604. Connecting the pressure adjustment oil passage 604 to the intake port 63b-side in this manner can improve intake efficiency of the gear pump 63, and therefore can improve hydraulic controllability. Further, a hydraulic sensor 65, which detects a brake hydraulic pressure in the branch flow passage 602, is provided. The reservoir 5 is illustrated as if this is a separate different member from the reservoir 5 illustrated above the master cylinder MU for convenience of the illustration of the drawing, but they actually indicate the integral member.

The ABS unit 7 is connected to the primary hydraulic chamber 304 of the master cylinder unit MU via a P system pipe MU1, and is connected to the secondary hydraulic chamber 305 via an S system pipe MU2. A specific internal configuration of the ABS unit 7 is a conventionally known configuration. More specifically, the ABS unit 7 is configured to include a pressure increase vale capable of blocking the supply of the brake fluid from the master cylinder unit MU-side, a pressure reduction valve capable of reducing the pressure of the brake fluid in the wheel cylinder, an internal reservoir storing therein the brake fluid flowing out when the pressure is reduced, an ABS pump that causes the brake fluid in the internal reservoir to flow back to the master cylinder unit MU-side, and an ABS controller that controls activation states of each of the valves and the ABS pump when a wheel is detected to be getting locked based on the wheel speed of each of the wheels. A control unit 80 includes a boosting control unit that assists the driver's pressing force based on detection signals of the pressing force sensor 81 and the hydraulic sensor 65, and a fluid amount control unit that deals with a request requiring high responsiveness. Then, the control unit 80 controls activation states of the motor M, the switching vale 61, and the pressure reduction control valve 62 for the pump unit 6.

(Operation During Pressing Force Brake or Automatic Brake in Normal Use Range)

Figure 2:
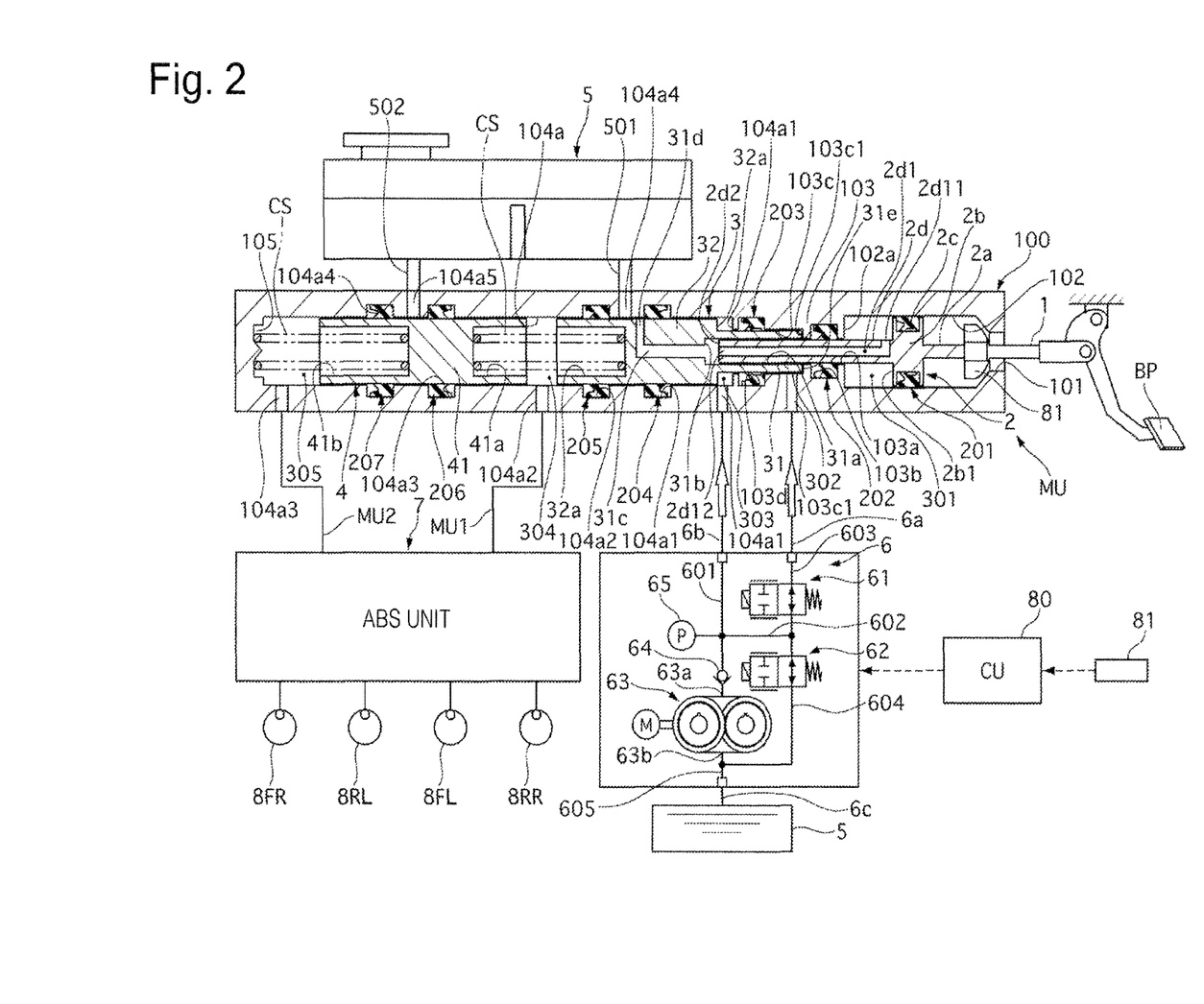
FIG. 2 illustrates an activated state of the brake apparatus in a normal use range with respect to the brake apparatus according to the first embodiment.

Next, an operation based on the above-described configuration will be described. FIG. 2 illustrates an activated state of the brake apparatus in a normal use range with respect to the brake apparatus according to the first embodiment. First, the operation of the brake apparatus will be described focusing on the operation when the boosting control is performed according to pressing force brake caused by the driver in the normal use range. The normal use range refers to, for example, a range in which the boosting control is performed according to a preset boosting rate when the vehicle is slowed down at a low deceleration rate or when the vehicle is stopped at an intersection or the like, which are not a range when the vehicle is in an emergency state such as being suddenly braked. Further, automatic brake control refers to control that automatically generates the master cylinder hydraulic pressure when the brake hydraulic pressure is requested from another vehicle controller (adaptive cruise control, lane keeping control, or the like), regardless of the operation performed by the driver on the brake pedal.

When the driver presses the brake pedal, a reaction force is not applied to the first piston 2b because the reservoir chamber 301 maintains an atmospherically opened pressure therein. Further, since the operation rod 2 and the stepped primary piston 3 are displaceable relative to each other, only a reaction force as small as friction is generated until the end 2d2 of the small-diameter piston 2d abuts against the bottom 31b of the stepped primary piston 3. Therefore, only a weak pressing force is generated at this stage, and the boosting control is not especially performed. When the end 2d2 of the small-diameter piston 2d abuts against the bottom 31b of the stepped primary piston 3, the stepped primary piston 3 starts to be displaced, and the master cylinder hydraulic pressure starts to be generated in the primary hydraulic chamber 304 and the secondary hydraulic chamber 305. Along therewith, in the control unit 80, the pressing force sensor 81 detects the driver's pressing force and a target assist hydraulic pressure Pasist* is calculated by multiplying the pressing force by the predetermined boosting rate. Further, the pump unit 6 is also driven.

In the pump unit 6, the switching valve 61 and the pressure reduction control valve 62 are switched to an opened state and a closed state, respectively, and the gear pump 63 is driven. As a result, as indicated by an arrow in FIG. 2, a same discharge pressure Ppump is applied to both the first pressure chamber 302 and the second pressure chamber 303. A sum (S1+S2) of an effective pressure-receiving area S1 of the first pressure chamber 302 and an effective pressure-receiving area S2 of the second pressure chamber 303 is equal to an effective pressure-receiving area S0 of the primary hydraulic chamber 304, whereby the master cylinder hydraulic pressure Pmc is calculated as "Pmc=Pdri+Ppump−Pcs", which is a value resultant from subtracting a hydraulic pressure Pcs corresponding to the spring that is acquired by dividing a reaction force of the coil spring CS by the effective pressure-receiving area from a sum of a hydraulic pressure Pdri corresponding to the pressing force that is acquired by dividing the pressing force applied by the driver by the effective pressure-receiving area, and the pump discharge pressure Ppump. If the pump discharge pressure Ppump detected by the hydraulic sensor 65 is higher than the target assist hydraulic pressure Pasist*, the brake apparatus performs pressure reduction control by controlling the pressure reduction control valve 62 to open it so as to cause the brake fluid to flow back toward the intake port 63b, thereby achieving the target assist hydraulic pressure Pasist*. In this manner, the brake apparatus prevents the driver from having a sense of discomfort toward a pedal feeling by performing the boosting control according to the pressing force.

In the case of the automatic brake control, a requested master cylinder hydraulic pressure Pmc* is transmitted from another vehicle controller. At this time, the hydraulic pressure Pdri corresponding to the pressing force is 0, and the pump discharge pressure Ppump that satisfies a relationship "Pmc*=Ppump−Pcs, and thus Ppump=Pmc*+Pcs" is set as the target assist hydraulic pressure Pasist*. Then, similarly to when the boosting control is performed, the pump unit 6 functions in such a manner that the gear pump 63 is driven and the switching valve 61 and the pressure reduction control valve 62 are switched to the opened state and the closed state, respectively, and the pressure reduction control is performed as necessary. At this time, if the driver does not operate the brake pedal BP, the operation rod 2 is not displaced and only the stepped primary piston 3 and the secondary piston 4 are displaced since the operation rod 2 and the stepped primary piston 3 are displaceable relative to each other. Therefore, the brake apparatus prevents the driver from having such a sense of discomfort that the brake pedal BP is moving on its own. Further, if the driver presses the brake pedal BP while the automatic brake control is in operation, the brake fluid in the reservoir chamber 301 can flow back toward the reservoir 5 via the small-diameter piston inner shaft center flow passage 2d1 and the radial flow passage 2d11. Therefore, the driver becomes able to press the brake pedal BP, which can prevent the driver from having a sense of discomfort.

(Operation During Pressing Force Brake or Automatic Brake in Case of Emergency)

Figure 3:
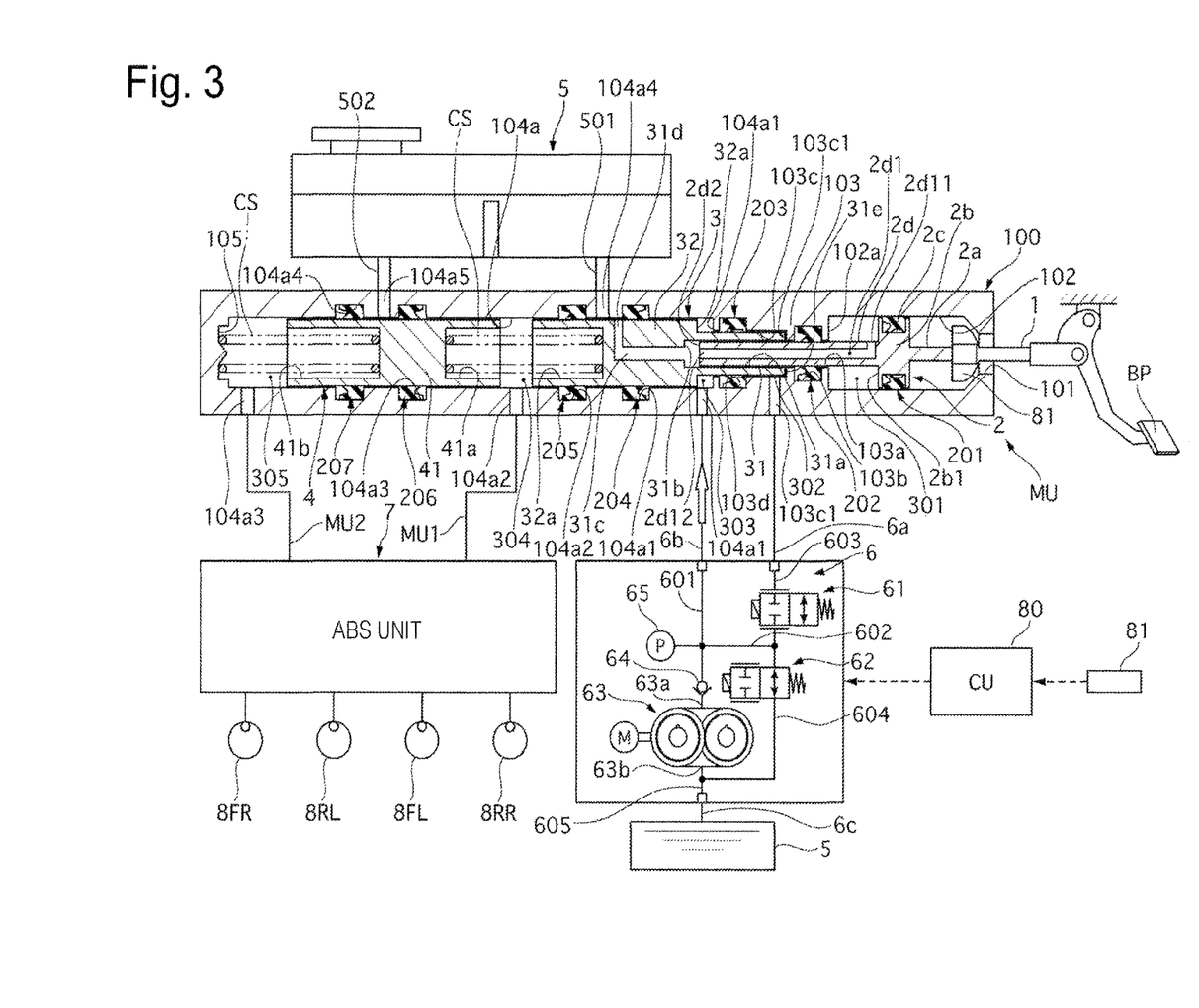
FIG. 3 illustrates an activated state of the brake apparatus under an emergency situation with respect to the brake apparatus according to the first embodiment.

FIG. 3 illustrates the activated state of the brake apparatus when the vehicle is in an emergency situation with respect to the brake apparatus according to the first embodiment. The emergency situation refers to when the driver suddenly presses the brake pedal BP and the pressing force sensor 81 detects a rise of the pressing force at a predetermined or greater gradient, and when an emergency brake request is issued from another vehicle controller (for example, collision prevention control) and the master cylinder hydraulic pressure is requested to rise quickly within a short time period. The basic operation is similar to the activated state of the brake apparatus in the normal use range, but the operation in the emergency situation is different in terms of switching the switching valve 61 to the closed state if the vehicle is determined to be in the emergency situation. As a result, the brake fluid discharged from the pump unit 6 is entirely supplied only to the second pressure chamber 303, as indicated by an arrow in FIG. 3.

Figure 4:
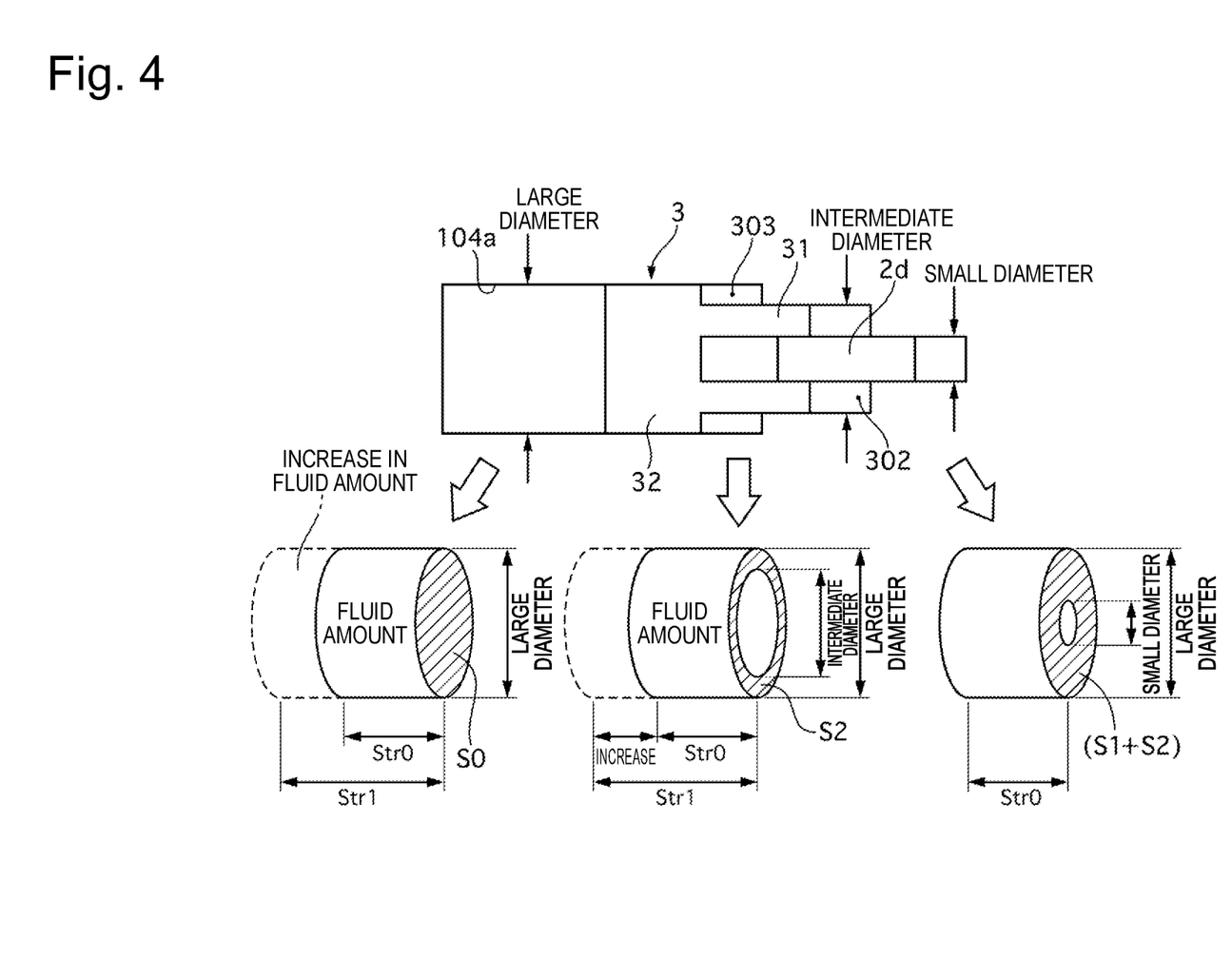
FIG. 4 schematically illustrates a relationship among respective effective pressure-receiving areas of hydraulic chambers in the brake apparatus according to the first embodiment.
Figure 5:
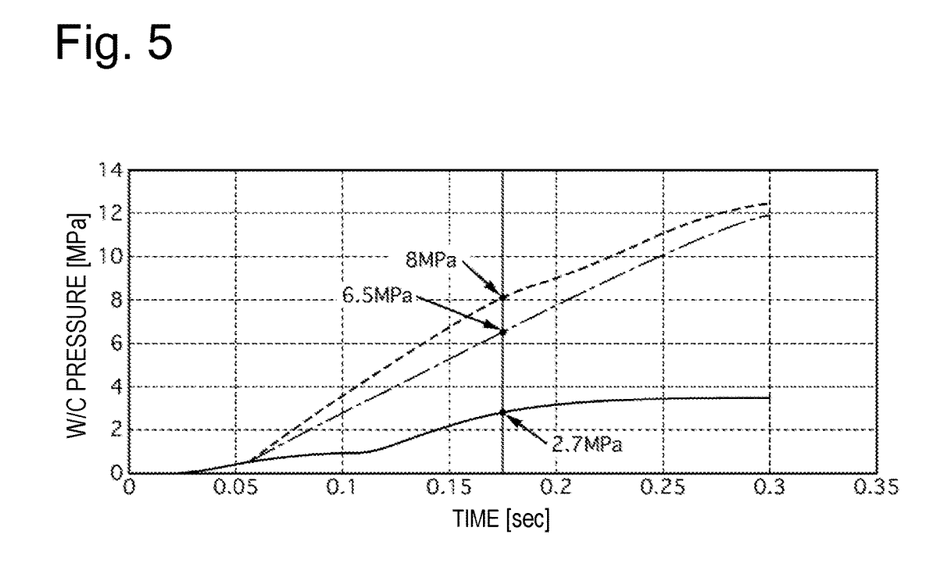
FIG. 5 is a timing diagram illustrating how a wheel cylinder hydraulic pressure rises at the time of each control operation in the brake apparatus according to the first embodiment.

Now, a reason for switching the switching valve 61 to the closed state will be described. FIG. 4 schematically illustrates a relationship between the respective effective pressure-receiving areas of the hydraulic chambers in the brake apparatus according to the first embodiment. FIG. 5 is a timing diagram illustrating how the wheel cylinder hydraulic pressure rises at the time of each control in the brake apparatus according to the first embodiment. At the time of the normal pressing force brake in which the pump unit 6 is not activated at all, the wheel cylinder hydraulic pressure reaches a predetermined hydraulic pressure (for example, 2.7 Mpa) at an early stage of the pressing when a predetermined time period has elapsed from a start of the pressing (for example, after a time period around 150 msec has elapsed since the start of the pressing), as indicated by a solid line in FIG. 5. Next, if the brake fluid discharged from the pump unit 6 is supplied to both the first pressure chamber 302 having the effective pressure-receiving area S1 and the second pressure chamber 303 having the effective pressure-receiving area S2, this supply is basically the same as supply of the brake fluid to a non-step piston having the effective pressure-receiving area S0 (=S1+S2). Therefore, according to the boosting control performed by the pump unit 6, a hydraulic pressure twice as high as the predetermined hydraulic pressure or a higher hydraulic pressure (for example, 6.5 Mpa) can be achieved as indicated by a chain line in FIG. 5. Therefore, no problem lies with responsiveness at the early stage of the pressing of the brake pedal as long as the vehicle is braked in the normal use range.

However, the brake apparatus faces such a request that the responsiveness is desired to be secured especially at the early stage of the pressing of the brake pedal when the vehicle is in the emergency situation. In this case, the motor M and/or the gear pump 63 should be increased in size, raising a problem of leading to a cost increase and a size increase in the entire apparatus. Especially, the fluid amount is consumed according to a stroke of a brake pad at each of the wheels to allow the wheel cylinder hydraulic pressure to rise quickly, and the brake hydraulic pressure tends to start rising after this fluid amount is consumed. In other words, at the early stage of the pressing of the brake pedal, hydraulic stiffness is low compared to a later stage of the pressing during which the brake pedal is sufficiently pressed, so that a large amount of brake fluid is required to increase the hydraulic pressure. Therefore, in the first embodiment, the brake apparatus is equipped with the switching valve 61, and is configured to supply the entire discharge pressure of the pump unit 6 to the second pressure chamber 303 having the effective pressure-receiving area S2 only when the vehicle is in the emergency situation.

Now, as illustrated in FIG. 4, a discharge amount equivalent to S0×Str0 is supplied, assuming that Str0 represents a stroke amount of the stepped primary piston 3 during a predetermined time period when the discharge amount from the pump unit 6 is maximally supplied in the normal use range. Next, when the switching valve 61 is switched to the closed state, the effective pressure-receiving area reduces to S2 in this case, whereby a stroke amount Str1 at this time is calculated as "Str1=(S0×Str0)/S2". Since the relationship between S2 and S0 is S2<S0, a larger stroke amount can be secured. Therefore, as indicated by a dotted line in FIG. 4, the brake fluid amount equivalent to S0×Str1 can be supplied to the ABS unit 7, which can swiftly solve the consumption of the fluid amount according to the stroke of the brake pad and the like, thereby allowing the brake hydraulic pressure to rise quickly. As a result, a further high hydraulic pressure (for example, 8 Mpa) than when the boosting control is performed can be achieved when the predetermined time period has elapsed, as indicated by a dotted line in FIG. 5.

If the brake fluid is continuously supplied only to the second pressure chamber 303, a creatable maximum assist force is S2×Ppump. On the other hand, if the brake fluid is supplied to both the first pressure chamber 302 and the second pressure chamber 303, the creatable maximum assist force is (S1+S2)×Ppump. In other words, it is more advantageous to supply the brake fluid to both the first pressure chamber 302 and the second pressure chamber 303 to acquire the maximum assist force. Therefore, the switching valve 61 is switched to the opened state upon an elapse of a longer time period than the predetermined time period, or establishment of a condition under which it is more advantageous to supply the brake fluid to both the first pressure chamber 302 and the second pressure chamber 303 in view of the wheel cylinder hydraulic pressure.

In the above-described manner, the first embodiment can bring about the following advantageous effects.

(1) The brake apparatus includes the brake pedal BP (a brake operation member) configured to be operated by the driver; the pressing force sensor 81 configured to detect the pressing force that is the operation state of the brake pedal BP or the portion configured to receive the brake request from another vehicle controller that issues the brake request based on the state of the vehicle (a state detection unit); the cylinder formed in the master cylinder housing 100 (a housing) with the one end side thereof closed and including the intermediate-diameter piston insertion hole 103c and the large-diameter piston insertion hole 104a; the intermediate-diameter piston insertion hole 103c (a first portion) formed on the opening side in the cylinder and having the small diameter, and the large-diameter piston insertion hole 104a (a second portion) formed on the closed portion 105-side and having the larger diameter than the diameter of the intermediate-diameter piston insertion hole 103c; the operation rod 2 (an operation rod having a first diameter) configured to be activated in the cylinder in the axial direction according to the operation of the brake pedal BP; and the stepped primary piston 3 (a stepped piston) including, on the one side, the intermediate-diameter piston 31 (an intermediate-diameter portion) having the larger diameter than the diameter (the first diameter) of the small-diameter piston 2d of the operation rod 2, the large-diameter piston 32 (a large-diameter portion) formed continuously from the intermediate-diameter piston 31 and having the larger diameter than the diameter of the intermediate-diameter piston 31, and the insertion hole 31a in which the operation rod 2 is relatively displaceably inserted from the axial direction. The stepped primary piston 3 (the stepped piston) is configured to generate the master cylinder hydraulic pressure by being displaced in the cylinder in the axial direction. The brake apparatus further includes the second cup seal 202 (a first seal member) in slidable contact with the outer peripheral surface of the operation rod 2; the third cup seal 203 (a second seal member) in slidable contact with the outer peripheral surface of the intermediate-diameter piston 31 in the intermediate-diameter piston insertion hole 103c and configured to permit only the flow of the brake fluid from the one side; the first pressure chamber 302 formed between the second cup seal 202 and the one side of the third cup seal 203; the fourth cup seal 204 (a third seal member) in slidable contact with the outer peripheral surface of the large-diameter piston 32 in the large-diameter piston insertion hole 104a; the second pressure chamber 303 formed between the opposite side of the third cup seal 203 and the fourth cup seal 204; the pump unit 6 (a hydraulic source) configured to supply the brake fluid to the first pressure chamber 302 and the second pressure chamber 303; the first flow passage 603 (a first oil passage) connecting the pump unit 6 and the first pressure chamber 302 to each other; the second flow passage 601 (a second oil passage) connecting the pump unit 6 and the second pressure chamber 303 to each other; and the fluid amount control unit configured to control the amount of the brake fluid to be supplied to the first pressure chamber 302 and the second pressure chamber 303, and increase the amount of the brake fluid to be supplied to the second pressure chamber 303 when the detected state is the preset pressure increase request requiring the high responsiveness. Therefore, the brake apparatus can secure a sufficient brake fluid amount when the detected state is the pressure increase request requiring the high responsiveness, and therefore can improve the responsiveness for increasing the pressure.

(2) In the brake apparatus according to the above-described item (1), the fluid amount control unit includes the gear pump 63 (a pump) configured to discharging the brake fluid to the first flow passage 603 and the second flow passage 601, and the switching valve 61 provided in the first flow passage 603. The fluid amount control unit increases the amount of the brake fluid to be supplied to the second pressure chamber 303 by driving the switching valve 61 in the valve-closing direction. Therefore, the brake apparatus can easily control the amount of the brake fluid to be supplied by driving the switching valve 61. The brake apparatus may employ not only the gear pump 63 but also an accumulator, a plunger pump, or the like.

(3) In the brake apparatus according to the above-described item (2), the fluid amount control unit includes the pressure adjustment oil passage 604 configured to allow the brake fluid discharged from the gear pump 63 to flow back to the intake side of the gear pump 63. Therefore, the brake apparatus can improve the intake efficiency of the gear pump 63, and therefore can improve the hydraulic controllability.

(4) In the brake apparatus according to the above-described item (3), the pressure reduction control valve 62 is provided in the pressure adjustment oil passage 604. The pressure reduction control valve 62 is configured to transmit the brake fluid output from the first pressure chamber 302 or the second pressure chamber 303 to the reservoir 5 (a reservoir tank) or the intake side of the gear pump 63 when being opened. Therefore, the brake apparatus can control the hydraulic pressure to be supplied to the master cylinder unit MU by controlling the pressure reduction control valve 62, and therefore can easily control the activation state of the stepped primary piston 3.

(5) In the brake apparatus according to the above-described item (2), the operation rod 2 (or the brake pedal BP) includes the pressing force sensor 81 (a brake operation force detection unit) configured to detect the brake operation force. The fluid amount control unit calculates the amount to be supplied according to the detected pressing force (the detected brake operation force). Therefore, the brake apparatus allows the brake fluid to be supplied to the master cylinder MU by an amount according to the pressing force, and therefore can improve the pedal feeling.

(6) In the brake apparatus according to the above-described item (1), the preset request requiring the high responsiveness is the request to suddenly brake the vehicle.

Therefore, the brake apparatus can secure a sufficient braking force when the request to suddenly brake the vehicle is issued.

(7) In the brake apparatus according to the above-described item (6), the fluid amount control unit supplies the brake fluid to the first pressure chamber 302 and the second pressure chamber 303 to displace the stepped primary piston 3, thereby generating the master cylinder hydraulic pressure, except when the detected state is the request to suddenly brake the vehicle. Therefore, the brake apparatus can sufficiently secure the braking force for a situation other than when the vehicle is suddenly braked, by supplying the brake fluid to both the pressure chambers.

(8) In the brake apparatus according to the above-described item (1), the fluid amount control unit performs the automatic brake control that controls, based on the detected state, the amount to be supplied to both the pressure chambers 302 and 303 to activate the stepped primary piston 3, thereby generating the master cylinder hydraulic pressure. Therefore, the brake apparatus can perform the automatic brake control that generates the braking force regardless of the state of the operation performed by the driver on the brake pedal.

(9) In the brake apparatus according to the above-described item (8), the stepped primary piston 3 includes the large-diameter piston inner shaft center flow passage 31c (a low pressure communication hole) that forms the low pressure portion in the insertion hole 31a. In other words, the brake fluid in the reservoir chamber 301 is in communication with the reservoir 5, which allows the operation rod 2 and the stepped primary piston 3 to be displaced relative to each other. Therefore, the brake apparatus allows the driver to easily press the pedal even if the driver presses the brake pedal BP when the automatic brake is ongoing.

(10) The brake apparatus includes the brake pedal BP (a brake operation member) configured to be operated by the driver; the pressing force sensor 81 (a brake operation state detection unit) configured to detect the operation state of the brake pedal BP; the master cylinder housing 100 (a housing) including the first pressure chamber 302 (a first chamber) on the opening side in the cylinder having the closed one end side, the second pressure chamber 303 (a second chamber) on the closed portion side, and the first partition wall 103 (a partition wall) formed between the first pressure chamber 302 and the second pressure chamber 303; the operation rod 2 (an operation rod having a first diameter) including the small-diameter piston 2d configured to be activated in the axial direction between the first pressure chamber 302 and the second pressure chamber 303 via the through-hole formed through the first partition wall 103 according to the operation of the brake pedal BP; and the stepped primary piston 3 (a piston). The stepped primary piston 3 (the piston) includes the intermediate-diameter piston insertion hole 103c (a first portion) formed on the opening side in the second pressure chamber 303 and having the small diameter, the large-diameter piston insertion hole 104a (a second portion) formed on the closed portion side and having the larger diameter than the diameter of the first pressure chamber 302, the insertion hole 31a provided in the second pressure chamber 303 and configured to allow the operation rod 2 to be inserted from the axial direction in such a manner that the one end side thereof protrudes, the intermediate-diameter piston 31 (an intermediate-diameter portion) having the diameter larger than the first diameter and corresponding to the intermediate-diameter piston insertion hole 103c on the one side, and the large-diameter piston 32 (a large-diameter portion) formed continuously from the intermediate-diameter piston 31 and having the diameter corresponding to the large-diameter piston insertion hole 104a. The brake apparatus further includes the second cup seal 202 (a first seal member) in slidable contact with the outer peripheral surface of the protruding portion of the operation rod 2; the third cup seal 203 (a second seal member) in slidable contact with the outer peripheral surface of the intermediate-diameter piston 31 and configured to permit only the flow of the brake fluid from the one side; the first pressure chamber 302 formed between the second cup seal 202 and the one side of the third cup seal 203; the fourth cup seal 204 (a third seal member) in slidable contact with the outer peripheral surface of the large-diameter piston 32; the second pressure chamber 303 formed between the opposite side of the third cup seal 203 and the fourth cup seal 204; the pump unit 6 (a hydraulic source) configured to supply the brake fluid to the first pressure chamber 302 and the second pressure chamber 303; the first flow passage 603 (a first oil passage) connecting the pump unit 6 and the first pressure chamber 302 to each other; the second flow passage 601 (a second oil passage) connecting the pump unit 6 and the second pressure chamber 303 to each other; and the fluid amount control unit having the first state, in which the fluid amount control unit controls the amount of the brake fluid to be supplied to the first pressure chamber 302 and the second pressure chamber 303, and the second state, in which the fluid amount control unit preferentially supplies the brake fluid to the second pressure chamber 303. Therefore, the brake apparatus can supply the brake fluid to the pressure chamber that should be provided with the brake fluid as necessary, and therefore can secure a sufficient brake fluid amount.

(11) In the brake apparatus according to the above-described item (10), the fluid amount control unit operates in the second state when the detected brake operation state is the preset request requiring the high responsiveness. Therefore, the brake apparatus can secure a sufficient braking force when the request to suddenly brake the vehicle is issued.

(12) In the brake apparatus according to the above-described item (11), the fluid amount control unit operates in the first state when the detected brake operation state is a state other than the preset request requiring the high responsiveness. Therefore, the brake apparatus can sufficiently secure the braking force for a situation other than when the vehicle is suddenly braked, by supplying the brake fluid to both the pressure chambers.

(13) In the brake apparatus according to the above-described item (10), the fluid amount control unit includes the pressure adjustment oil passage 604 configured to allow the brake fluid discharged from the gear pump 63 to flow back to the intake side of the gear pump 63.

(14) In the brake apparatus according to the above-described item (13), the pressure reduction control valve 62 is provided in the pressure adjustment oil passage 604. The pressure reduction control valve 62 is configured to transmit the brake fluid output from the first pressure chamber 302 or the second pressure chamber 303 to the reservoir tank 5 or the intake side of the gear pump 63 when being opened. Therefore, the brake apparatus can control the hydraulic pressure to be supplied to the master cylinder unit MU by controlling the pressure reduction control valve 62, and therefore can easily control the activation state of the stepped primary piston 3.

(15) In the brake apparatus according to the above-described item (10), the stepped primary piston 3 includes the large-diameter piston inner shaft center flow passage 31c (a low pressure communication hole) that establishes communication between the inside of the insertion hole 31a and the low pressure portion. In other words, the brake fluid in the reservoir chamber 301 is in communication with the reservoir 5, which allows the operation rod 2 and the stepped primary piston 3 to be displaced relative to each other. Therefore, the brake apparatus allows the driver to easily press the pedal even if the driver presses the brake pedal BP when the automatic brake is ongoing.

(16) In the brake apparatus according to the above-described item (10), the brake apparatus is configured to activate the stepped primary piston 3 by the supplied brake fluid, and is configured in such a manner that the brake fluid discharged due to the activation of the stepped primary piston 3 is supplied to the ABS unit 7 (a hydraulic unit for anti-lock control). Therefore, the brake apparatus can form a system capable of realizing various kinds of control with use of the inexpensive ABS unit 7.

(17) The brake system includes the brake pedal BP (a brake operation member) configured to be operated by the driver; the pressing force sensor 81 (a brake operation state detection unit) configured to detect the operation state of the brake pedal BP; the cylinder formed in the master cylinder housing 100 (a housing) and having the closed one end side; the stepped primary piston 3 (a piston) provided displaceably in the axial direction in the cylinder and configured to change the master cylinder hydraulic pressure by being displaced in the axial direction; and the operation rod 2 configured to activate the stepped primary piston 3 according to the operation of the brake pedal BP. The cylinder includes the intermediate-diameter piston insertion hole 103c (a first portion), and the large-diameter piston insertion hole 104a (a second portion) having the larger diameter than the diameter of the intermediate-diameter piston insertion hole 103c. The stepped primary piston 3 includes the insertion hole 31a in which the operation rod 2 is slidably inserted in such a manner that the one end of the operation rod 2 protrudes from the one end of the stepped primary piston 3, the intermediate-diameter piston 31 (an intermediate-diameter portion) configured to be positioned in the intermediate-diameter piston insertion hole 103c and having the larger diameter than the diameter of the small-diameter piston 2d of the operation rod 2, and the large-diameter piston 32 (a large-diameter portion) configured to be positioned in the large-diameter piston insertion hole 104a, formed continuously from the intermediate-diameter piston 31, and having the larger diameter than the diameter of the intermediate-diameter piston 31. The brake system further includes the second cup seal 202 (a first seal member) in slidable contact with the outer peripheral surface of the protruding small-diameter piston 2d of the operation rod 2; the third cup seal 203 (a second seal member) in slidable contact with the outer peripheral surface of the intermediate-diameter piston 31 and configured to permit only the flow of the brake fluid from the one side; the first pressure chamber 302 formed between the second cup seal 202 and the one side of the third cup seal 203; the fourth cup seal 204 (a third seal member) in slidable contact with the outer peripheral surface of the large-diameter piston 32; the second pressure chamber 303 formed between the opposite side of the third cup seal 203 and the fourth cup seal 204; the pump unit 6 (a hydraulic source) configured to supply the brake fluid to the first pressure chamber 302 and the second pressure chamber 303; the first flow passage 603 (a first oil passage) connecting the pump unit 6 and the first pressure chamber 302 to each other; the second flow passage 601 (a second oil passage) connecting the pump unit 6 and the second pressure chamber 303 to each other; and the fluid amount control unit configured to control the amount of the brake fluid to be supplied to the first pressure chamber 302 and the second pressure chamber 303. The fluid amount control unit includes the switching valve 61 (a switching unit) configured to supply the brake fluid to the second pressure chamber 303 when the detected brake operation state is the preset request requiring the high responsiveness, and supply the brake fluid to the first pressure chamber 302 and the second pressure chamber 303 when the detected brake operation state is the request requiring low responsiveness. The fluid amount control unit is configured to activate the stepped primary piston 3 by the supplied brake fluid, and is configured in such a manner that the brake fluid discharged due to the activation of the stepped primary piston 3 is supplied to the ABS unit 7 (a hydraulic unit for anti-lock control). Therefore, the brake apparatus can secure a sufficient brake fluid amount when the detected state is the pressure increase request requiring the high responsiveness, and therefore can improve the responsiveness for increasing the pressure. Further, the brake apparatus can easily control the amount of the brake fluid to be supplied by driving the switching valve 61. Further, the brake apparatus can sufficiently secure the braking force for a situation other than when the vehicle is suddenly braked, by supplying the brake fluid to both the pressure chambers, when the detected brake operation state is the request requiring the low responsiveness. Further, the brake apparatus can form a system capable of realizing various kinds of control with use of the inexpensive ABS unit 7.

(18) In the brake apparatus according to the above-described item (17), the fluid amount control unit performs the automatic brake control that controls, based on the detected state, the switching valve 61 to activate the stepped primary piston 3, thereby generating the master cylinder hydraulic pressure. Therefore, the brake apparatus can perform the automatic brake control that generates the braking force regardless of the state of the operation performed by the driver on the brake pedal.

(Another Embodiment)

Figure 6:
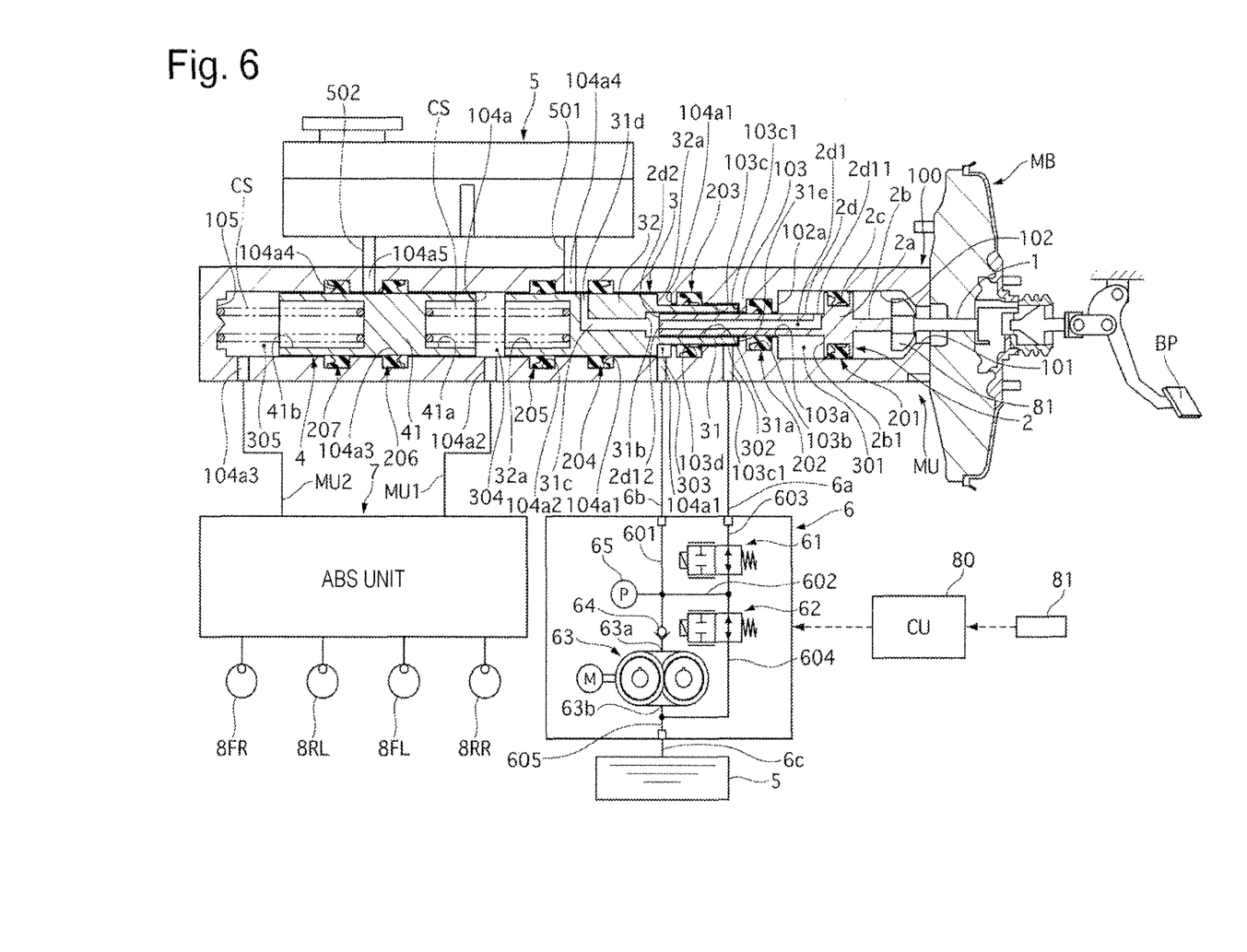
FIG. 6 is a system diagram schematically illustrating a configuration of a brake apparatus according to another embodiment.

FIG. 6 is a system diagram schematically illustrating a configuration of a brake apparatus according to another embodiment. A basic configuration of this brake apparatus is similar to the first embodiment, except for provision of an engine negative-pressure booster MB. The brake apparatus is used basically in a similar manner to the first embodiment. The engine negative-pressure booster MB assists the force with which the driver presses the brake pedal. The control unit 80 is similar to the first embodiment in terms of including the boosting control unit that assists the driver's pressing force based on the detection signal of the pressing force sensor 81, and the fluid amount control unit that deals with the request requiring the high responsiveness, and controlling the activation states of the motor M, the switching valve 61, and the pressure reduction control valve 62 for the pump unit 6. Then, the brake apparatus sets the target assist hydraulic pressure from which a pressure corresponding to the assist force provided by the engine negative-pressure booster MB is subtracted. Therefore, when being mounted on a vehicle capable of securing a sufficient negative pressure, the brake apparatus can reduce a required pressure increase capability that the pump unit 6 should satisfy, and can achieve a reduction in the size of the entire apparatus. Further, maintaining the capability of the pump unit 6 to a certain degree allows the engine negative-pressure booster MB to reduce in size, thereby contributing to improvement of fuel efficiency.

Having described several embodiments of the present invention, the above-described embodiments of the present invention are intended to only facilitate the understanding of the present invention, and are not intended to limit the present invention thereto. Needless to say, the present invention can be modified or improved without departing from the spirit of the present invention, and includes equivalents thereof. Further, the individual components described in the claims and the specification can be arbitrarily combined or omitted within a range that allows them to remain capable of achieving at least a part of the above-described objects or producing at least a part of the above-described advantageous effects.

This application claims priority to Japanese Patent Application No. 2014-129866 filed on Jun. 25, 2014. The entire disclosure of Japanese Patent Application No. 2014-129866 filed on Jun. 25, 2014 including the specification, the claims, the drawings, and the summary is incorporated herein by reference in its entirety.

REFERENCE SIGNS LIST 1 push rod
2 operation rod
2a pedal-side rod
2b piston
2d small-diameter piston
2d1 small-diameter piston inner shaft center flow passage
2d11 radial flow passage
2d2 end
3 stepped primary piston
4 secondary piston
5 reservoir
6 pump unit
6a first pipe
6b second pipe
7 ABS unit
8 wheel cylinder
80 control unit
31 intermediate-diameter piston
31a insertion hole
31b bottom
31c large-diameter piston inner shaft center flow passage
31d radial flow passage
32 large-diameter piston
32a doughnut-shaped end surface
61 switching valve
62 pressure reduction control valve
63 gear pump
63a discharge port
63b intake port
64 check valve
65 hydraulic sensor
81 pressing force sensor
100 master cylinder housing
101 opening
102 operation rod containing portion
103 partition wall
103a small-diameter piston through-hole
103c intermediate-diameter piston insertion hole
103c1 pressure chamber radial flow passage
104a large-diameter piston insertion hole
104a1 pressure chamber radial flow passage
105 closed portion
202 second cup seal
203 third cup seal
204 fourth cup seal
205 fifth cup seal
206 sixth cup seal
207 seventh cup seal
301 reservoir chamber
302 first pressure chamber
303 second pressure chamber
304 primary hydraulic chamber
305 secondary hydraulic chamber
604 pressure adjustment oil passage
BP brake pedal
CS coil spring
M motor
MU master cylinder unit
MB engine negative-pressure booster

The invention claimed is:

1. A brake apparatus comprising:
a brake operation member configured to be operated by a driver;
a state detection unit configured to detect an operation state of the brake operation member or a state of a vehicle;
a cylinder formed in a housing and having closed one end side;
a first portion formed on an opening side in the cylinder and having a small diameter, and a second portion formed on a closed portion side in the cylinder and having a larger diameter than the diameter of the first portion;
an operation rod configured to be activated in the cylinder in an axial direction according to the operation of the brake operation member, and having a first diameter;
a stepped piston including an intermediate-diameter portion having a larger diameter than the first diameter on one side, a large-diameter portion formed continuously from the intermediate-diameter portion and having a larger diameter than the diameter of the intermediate-diameter portion, and an insertion hole in which the operation rod is relatively displaceably inserted from the axial direction, the stepped piston being configured to generate a master cylinder hydraulic force by being displaced in the cylinder in the axial direction;
a first seal member in slidable contact with an outer peripheral surface of the operation rod;
a second seal member in slidable contact with an outer peripheral surface of the intermediate-diameter portion in the first portion, the second seal member being configured to permit only a flow of brake fluid from one side;
a first pressure chamber formed between the first seal member and the one side of the second seal member;
a third seal member in slidable contact with an outer peripheral surface of the large-diameter portion in the second portion;
a second pressure chamber formed between an opposite side of the second seal member and the third seal member;
a hydraulic source configured to supply the brake fluid to the first pressure chamber and the second pressure chamber;
a first oil passage connecting the hydraulic source and the first pressure chamber to each other;
a second oil passage connecting the hydraulic source and the second pressure chamber to each other; and
a fluid amount control unit configured to control an amount of the brake fluid to be supplied to the first pressure chamber and the second pressure chamber, and increase the amount of the brake fluid to be supplied to the second pressure chamber when the detected state is equal to a preset pressure increase request.

2. The brake apparatus according to claim 1, wherein the fluid amount control unit includes a pump configured to discharge the brake fluid to the first oil passage and the second oil passage, and a switching valve provided in the first oil passage, and
wherein the fluid amount control unit increases the amount of the brake fluid to be supplied to the second pressure chamber by driving the switching valve in a valve-closing direction.

3. The brake apparatus according to claim 2, wherein the fluid amount control unit includes a pressure adjustment oil passage configured to allow the brake fluid discharged from the pump to flow back to an intake side of the pump.

4. The brake apparatus according to claim 3, wherein a pressure reduction control valve is provided in the pressure adjustment oil passage, the pressure reduction control valve being configured to transmit the brake fluid output from the first pressure chamber or the second pressure chamber to a reservoir tank or the intake side of the pump when being opened.

5. The brake apparatus according to claim 2, wherein the operation rod or the brake operation member includes a brake operation force detection unit configured to detect a brake operation force, and
wherein the fluid amount control unit calculates the amount to be supplied according to the detected brake operation force.

6. The brake apparatus according to claim 1, wherein the fluid amount control unit Supplies the brake fluid to the first pressure chamber and the second pressure chamber to displace the stepped piston, thereby generating the master cylinder hydraulic pressure, except when the detected state is equal to the preset pressure increase request.

7. The brake apparatus according to claim 1, wherein the fluid amount control unit performs automatic brake control that controls, based on the detected state, the amount to be supplied to both the pressure chambers to activate the stepped piston, thereby generating the master cylinder hydraulic pressure.

8. The brake apparatus according to claim 7, wherein the stepped piston includes a low pressure communication hole that forms a low pressure portion in the insertion hole.

9. A brake apparatus comprising:
a brake operation member configured to be operated by a driver;
a brake operation state detection unit configured to detect an operation state of the brake operation member,
a housing including a first chamber on an opening side in a cylinder having closed one end side, a second chamber on a closed portion side, and a partition wall formed between the first chamber and the second chamber;
an operation rod configured to be activated in an axial direction between the first chamber and the second chamber via a through-hole formed through the partition wall according to the operation of the brake operation member, and having a first diameter;
a piston including a first portion formed on the opening side in the second chamber and having a small diameter, a second portion formed on the closed portion side and having a larger diameter than the diameter of the first chamber, an insertion hole provided in the second chamber and configured to allow the operation rod to be inserted from the axial direction in such a manner that one end side thereof protrudes, an intermediate-diameter portion having a diameter larger than the first diameter and corresponding to the first portion on one side, and a large-diameter portion formed continuously from the intermediate-diameter portion and having a diameter corresponding to the second portion;
a first seal member in slidable contact with an outer peripheral surface of the protruding portion of the operation rod;
a second seal member in slidable contact with an outer peripheral surface of the intermediate-diameter portion, and configured to permit only a flow of the brake fluid from one side:
a first pressure chamber formed between the first seal member and the one side of the second seal member;
a third seal member in slidable contact with an outer peripheral surface of the large-diameter portion;
a second pressure chamber formed between an opposite side of the second seal member and the third seal member;
a hydraulic source configured to supply the brake fluid to the first pressure chamber and the second pressure chamber;
a first oil passage connecting the hydraulic source and the first pressure chamber to each other;
a second oil passage connecting the hydraulic source and the second pressure chamber to each other; and
a fluid amount control unit having a first state, in which the fluid amount control unit controls an amount of the brake fluid to be supplied to the first pressure chamber and the second pressure chamber, and a second state, in which the fluid amount control unit supplies the brake fluid to the second pressure chamber.

10. The brake apparatus according to claim 9, wherein the fluid amount control unit operates in the second state when the detected brake operation state is equal to a preset request.

11. The brake apparatus according to claim 10, wherein the fluid amount control unit operates in the first state when the detected brake operation state is different than the preset request.

12. The brake apparatus according to claim 9, wherein the fluid amount control unit includes a pressure adjustment oil passage configured to allow the brake fluid discharged from a pump to flow back to an intake side of the pump.

13. The brake apparatus according to claim 12, wherein a pressure reduction control valve is provided in the pressure adjustment oil passage, the pressure reduction control valve being configured to transmit the brake fluid output from the first pressure chamber or the second pressure chamber to a reservoir tank or the intake side of the pump when being opened.

14. The brake apparatus according to claim 9, wherein the piston includes a low pressure communication hole that establishes communication between an inside of the insertion hole and a low pressure portion.

15. The brake apparatus according to claim 9, wherein the brake apparatus is configured to activate the piston by the supplied brake fluid, and is configured in such a manner that the brake fluid discharged due to the activation of the piston is supplied to a hydraulic unit for anti-lock control.

16. A brake system comprising:
a brake operation member configured to be operated by a driver;
a brake operation state detection unit configured to detect an operation state of the brake operation member;
a cylinder formed in a housing and having closed one end side:

a piston provided displaceably in an axial direction in the cylinder, and configured to change a master cylinder hydraulic pressure by being displaced in the axial direction; and an operation rod configured to activate the piston according to the operation of the brake operation member, wherein the cylinder includes a first portion, and a second portion having a larger diameter than a diameter of the first portion, the piston includes an insertion hole in which the operation rod is slidably inserted in such a manner that one end of the operation rod protrudes from one end of the piston, an intermediate-diameter portion configured to be positioned in the first portion and having a larger diameter than a diameter of the operation rod, and a large-diameter portion configured to be positioned in the second portion, formed continuously from the intermediate-diameter portion, and having a larger diameter than the diameter of the intermediate-diameter portion, and the brake system further comprising:

a first seal member in slidable contact with an outer peripheral surface of the protruding portion of the operation rod;

a second seal member in slidable contact with an outer peripheral surface of the intermediate-diameter portion, and configured to permit only a flow of the brake fluid from one side;

a first pressure chamber formed between the first seal member and the one side of the second seal member;

a third seal member in slidable contact with an outer peripheral surface of the large-diameter portion;

a second pressure chamber formed between an opposite side of the second seal member and the third seal member;

a hydraulic source configured to supply the brake fluid to the first pressure chamber and the second pressure chamber;

a first oil passage connecting the hydraulic source and the first pressure chamber to each other;

a second oil passage connecting the hydraulic source and the second pressure chamber to each other; and a fluid amount control unit configured to control an amount of the brake fluid to be supplied to the first pressure chamber and the second pressure chamber, wherein the fluid amount control unit includes a switching unit configured to supply the brake fluid to the second pressure chamber when the detected brake operation state is equal to a first preset request, and to supply the brake fluid to the first pressure chamber and the second pressure chamber when the detected brake operation state is equal to a second preset request, and wherein the fluid amount control unit is configured to activate the piston by the supplied brake fluid, and is configured in such a manner that the brake fluid discharged due to the activation of the piston is supplied to a hydraulic unit for anti-lock control.

17. The brake system according to claim 16, wherein the fluid amount control unit performs automatic brake control that controls, based on the detected state, the switching unit to activate the piston, thereby generating the master cylinder hydraulic pressure.

* * * * *